Patented July 7, 1931

1,812,856

UNITED STATES PATENT OFFICE

EDGAR C. BRITTON, OF MIDLAND, MICHIGAN, ASSIGNOR TO THE DOW CHEMICAL COMPANY, OF MIDLAND, MICHIGAN, A CORPORATION OF MICHIGAN

ACETYL-3-PHENYL-SALICYLIC ACID

No Drawing.   Application filed September 19, 1929.   Serial No. 393,846.

This invention relates to a new compound, acetyl-3-phenyl-salicylic acid, and to a method of preparing the same. The compound has the following structural formula:—

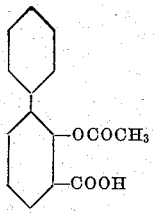

To prepare this new substance 3-phenyl salicylic acid is reacted with acetic anhydride in carbon tetrachloride solution, or in a solution of any other suitable solvent or without any solvent, if so desired. A small amount of a catalyst such as sulphuric acid, perchloric acid, etc. may be added to the reaction mixture. The mixture is heated to about 100° C. and reaction is complete within a few minutes. The reaction mixture is then diluted with water, and the aqueous solution is neutralized with sodium bicarbonate, whereupon crystals of acetyl-3-phenyl salicylic acid are precipitated. A more direct procedure consists simply in cooling the reaction mixture dissolved in carbon tetrachloride and seeding with a crystal of acetyl-3-phenyl salicylic acid. Such inoculation of the solution is apparently necessary in order to induce crystallization of the product from the reaction mixture, unless the excess acid is first neutralized. The crystals so obtained may be recrystallized from carbon tetrachloride or benzene without inoculating the solution.

The crystals form fine colorless hexagonal plates, having a melting point of 131–131.5° C. When slowly heated the crystals soften at 129° C. and melt as just stated, but when the heating is done rapidly the apparent melting point is about 135° C. The compound is readily soluble in acetone, somewhat less soluble in benzene or ethyl alcohol, still less soluble in carbon tetrachloride and practically insoluble in petroleum ether or water. It dissolves in a cold aqueous caustic soda solution from which it is reprecipitated by neutralizing with an acid. In hot aqueous alkali solution the compound is hydrolyzed and decomposed.

Example: To 5.8 grams 3-phenyl salicylic acid 2.5 grams acetic anhydride and a drop of concentrated sulphuric acid were added, and the mixture heated to about 100° C. on a water bath. In 15 minutes the reaction mass became homogeneous, indicating that reaction was complete. Upon cooling a heavy, viscous oil was formed, which was dissolved in carbon tetrachloride by warming. The solution was filtered, cooled and then seeded with a crystal of acetyl-3-phenyl salicylic acid. Upon standing crystals of the product were deposited which were then filtered and dried, the quantity obtained being 6 grams. Yield—86.5 per cent.

Acetyl-3-phenyl salicylic acid is related to the well known acetyl-salicylic acid, commonly called "aspirin", being the 3-phenyl substituted derivative of the latter. It has utility for medicinal use as an antipyretic and analgesic, similarly to acetyl-salicylic acid.

Other modes of applying the principle of my invention may be employed instead of the one explained, change being made as regards the materials employed, provided the product claimed in the following claim be thereby obtained.

I therefore particularly point out and distinctly claim as my invention:—

Acetyl-3-phenyl-salicylic acid.

Signed by me this 16 day of September, 1929.

EDGAR C. BRITTON.